United States Patent
Zalewski et al.

(10) Patent No.: US 10,809,387 B2
(45) Date of Patent: Oct. 20, 2020

(54) METHOD FOR SELECTING LOCALIZATION ALGORITHMS IN A VEHICLE

(71) Applicant: Continental Teves AG & Co. oHG, Frankfurt (DE)

(72) Inventors: Michael Zalewski, Frankfurt am Main (DE); Ulrich Stählin, Oakland Township, MI (US)

(73) Assignee: CONTINENTAL AUTOMOTIVE SYSTEMS, INC., Auburn Hills, MI (US)

(*) Notice: Subject to any disclaimer, the term of this patent is extended or adjusted under 35 U.S.C. 154(b) by 138 days.

(21) Appl. No.: 15/939,007

(22) Filed: Mar. 28, 2018

(65) Prior Publication Data
US 2018/0217269 A1    Aug. 2, 2018

Related U.S. Application Data

(63) Continuation of application No. PCT/EP2016/072323, filed on Sep. 20, 2016.

(30) Foreign Application Priority Data

Sep. 29, 2015  (DE) .................. 10 2012 217 810

(51) Int. Cl.
| | |
|---|---|
| *G01S 19/43* | (2010.01) |
| *G01S 19/42* | (2010.01) |
| *G01S 19/49* | (2010.01) |
| *G01S 19/50* | (2010.01) |
| *G01C 21/20* | (2006.01) |

(52) U.S. Cl.
CPC .............. *G01S 19/43* (2013.01); *G01C 21/20* (2013.01); *G01S 19/426* (2013.01); *G01S 19/49* (2013.01); *G01S 19/50* (2013.01)

(58) Field of Classification Search
CPC ........ G01S 19/43; G01S 19/426; G01S 19/49; G01S 19/50; G01C 21/20
USPC ............................................. 701/468
See application file for complete search history.

(56) References Cited

U.S. PATENT DOCUMENTS

| | | | |
|---|---|---|---|
| 6,577,952 B2 | 6/2003 | Geier et al. | |
| 8,195,392 B2 | 6/2012 | Watanabe et al. | |
| 2006/0152407 A1 | 7/2006 | Hatch et al. | |
| 2007/0010940 A1* | 1/2007 | Tan ........................ | G01C 21/20 |
| | | | 701/469 |
| 2011/0063165 A1 | 3/2011 | Riley et al. | |

FOREIGN PATENT DOCUMENTS

| | | |
|---|---|---|
| DE | 10353650 A1 | 12/2004 |
| DE | 102008012915 A1 | 9/2009 |
| EP | 1903306 A2 | 3/2008 |

(Continued)

OTHER PUBLICATIONS

Chen, Yuwei, Lane Detection Based on a Visual-Aided Multiple Sensors Platform, Position Location and Navigation Symposium (PLANS), IEEE/ION, SC, 2012, pp. 740-747, Myrtle Beach, SC.

(Continued)

*Primary Examiner* — Krishnan Ramesh

(57) ABSTRACT

A method for selecting localization algorithms in a vehicle, wherein the localization algorithms, in particular for satellite navigation or vehicle dynamics sensors, are selected on the basis of driving states.

15 Claims, 1 Drawing Sheet

(56) References Cited

FOREIGN PATENT DOCUMENTS

| EP | 2527873 A1 | 11/2012 |
|---|---|---|
| EP | 2816374 A1 | 12/2014 |
| WO | 9612973 A1 | 5/1996 |
| WO | 9724583 A1 | 7/1997 |
| WO | 2012167367 A1 | 12/2012 |

OTHER PUBLICATIONS

International Search Report and Written Opinion dated Dec. 20, 2016 from corresponding International Patent Application No. PCT/EP2016/072323.
German Search Report dated Jul. 20, 2016 for corresponding German Patent Application No. 10 2015 218 810.8.

* cited by examiner

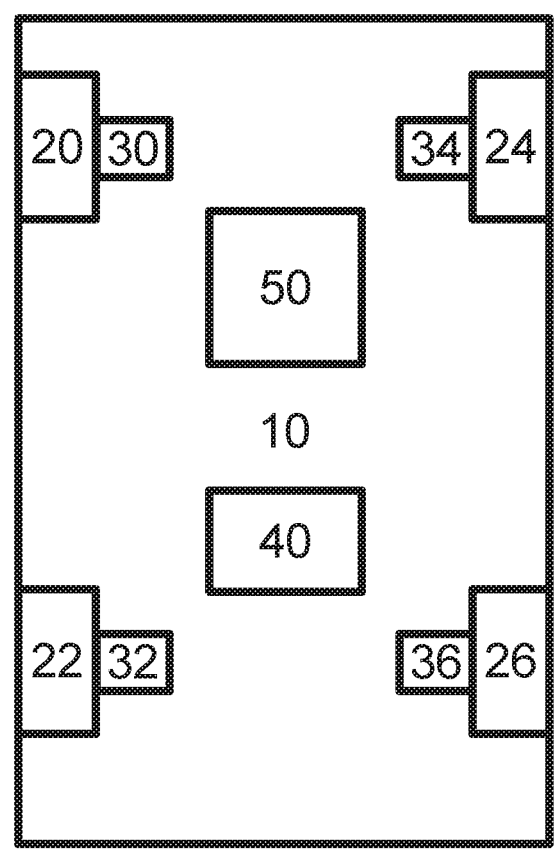

METHOD FOR SELECTING LOCALIZATION ALGORITHMS IN A VEHICLE

CROSS REFERENCE TO RELATED APPLICATION

This application is a continuation of International application No. PCT/EP2016/072323, filed Sep. 20, 2016, which claims priority to German application 10 2015 218 810.8, filed Sep. 29, 2015. The disclosures of the above applications are incorporated herein by reference.

TECHNICAL FIELD

The technical field relates to a method for selecting localization algorithms in a vehicle.

BACKGROUND

For very many functions in a vehicle, it is important to know the position of the vehicle. Establishing the position is also referred to as localization. The position can in particular be established by utilizing a satellite navigation system, also referred to as a GNSS (Global Navigation Satellite System).

It is known from the prior art that localization can be performed by fusion of satellite navigation and vehicle dynamics data. Examples of this are dead-reckoning systems or navigation systems. Performing standstill detection based on vehicle dynamics sensors is also known. This is used, by way of example, in electronic stability control (ESC).

There are numerous algorithms for determining the position of a vehicle or for aiding such a position determination which, by way of example, are based on satellite navigation or vehicle dynamics sensors. Such localization algorithms are typically designed to optimize overall performance independently of the driving situation, so that an averaged optimum position can be established. In so doing the various advantages of respective sensors in different driving situations are not addressed, however.

As such, it is desirable to present a method by which a localization can be improved. In addition, other desirable features and characteristics will become apparent from the subsequent summary and detailed description, and the appended claims, taken in conjunction with the accompanying drawings and this background.

SUMMARY

According to one exemplary embodiment, a method for selecting localization algorithms in a vehicle includes identifying a driving state of the vehicle. The method also includes selecting at least one localization algorithm from a predefined set of localization algorithms on the basis of the driving state.

The method according to one embodiment allows localization algorithms to be matched to the current driving state. In doing so, the advantages of a respective localization algorithm can be specifically exploited. This allows an overall substantially more accurate and less error-prone localization.

The driving state can, in particular, be identified by use satellite navigation and/or by utilizing one or more vehicle dynamics sensors. The driving state can also be identified by utilizing a standstill detection, which can be implemented in particular in an electronic stability control. Such devices are typically available in many vehicles anyway, so that hardly any additional expense is necessary here.

One of the driving states from the following list may be identified as the driving state:
  vehicle standstill,
  normal driving in an area with no implications for the vehicle dynamics,
  driving at a controlled constant speed, in particular with cruise control,
  driving at the limits of vehicle dynamics performance, in particular regarding acceleration.
Other driving states are also conceivable, however.

These driving states or a selection of driving states or also a selection or all of these driving states combined with other driving states may, by way of example, be stored as possible options in a module carrying out the method. As a function of information, by way of example, from satellite navigation modules, vehicle dynamics sensors or standstill detection, one of these driving states can then be selected so that the current driving state is suitably characterized.

A vehicle standstill can, in particular, be understood to be a state in which the vehicle is not moving along the ground. By way of example, this may be the case with the hand brake applied or the transmission in the park position. Even a standstill for a few seconds, by way of example, at a red light, without the wheels moving or wheel ticks, can be sufficient, however. Normal driving in an area with no implications for the vehicle dynamics can, by way of example, be identified if acceleration, lateral acceleration and/or speed values are below respective defined limiting values.

Driving at a controlled constant speed can, by way of example, be identified if cruise control has been switched on, maintaining a constant speed of the vehicle.

Driving at the limits of vehicle dynamics performance can, in particular, be identified if certain values, in particular a lateral acceleration, exceed a respectively determined threshold value.

In one exemplary embodiment, at least one localization algorithm for a satellite navigation system is selected. The localization algorithm for the satellite navigation system can, in particular, be selected from among the following set of localization algorithms:
  Single Point Position determination (SPP),
  Precision Point Position determination (PPP),
  Speed determination.
Such localization algorithms are in themselves known and have proved themselves in the localization of a vehicle. Other localization algorithms are also conceivable, however.

In one exemplary embodiment, at least one localization algorithm for vehicle dynamics sensors is selected. The localization algorithm for vehicle dynamics sensors can, in particular, be selected from among the following set of localization algorithms:
  single-track model,
  adaptive single-track model,
  double-track model,
  adaptive double-track model.
Such localization algorithms have proved themselves in localization functions on the basis of vehicle dynamics sensors. Other localization algorithms are also conceivable, however.

The localization algorithms for vehicle dynamics sensors can, by way of example, be combined with models which in particular are selected from the following set:
  Burckhardt tire model,
  Pacejka tire model.
These models have proved themselves. Other models, in particular tire models, can also be used, however. Models, in particular tire models, can essentially be selected as a function in particular of the driving states.

According to one embodiment, upon detection of a standstill, a position determination on the basis of vehicle dynamics sensors can be deactivated. In this way, a processing load in the electronics available in the vehicle can be reduced in particular, since establishment of a positional change is not necessary in any case when at a standstill. Preferably, PPP can be simultaneously selected as a localization algorithm for satellite navigation. This is a complicated localization algorithm involving a high processing load. By executing it during a standstill of the vehicle a very precise position of the vehicle can be established. This allows a very good starting value during subsequent driving of the vehicle. As a result of the above-mentioned deactivation of the position establishment on the basis of vehicle dynamics sensors, a large amount of processing power is available for executing the PPP localization algorithm.

Upon detection of a standstill the following may be carried out:
notification of the standstill to the localization algorithm, in particular for possible model switching, in particular in a satellite navigation module or a vehicle dynamics module.

This allows the identified standstill to be used within the framework of localization, by way of example for deactivating unnecessary functionalities, and instead performing complicated calculations, which may be advantageous if the vehicle starts moving again.

In particular, in the event of a standstill, a filtering of the position, an establishment of sensor noise, an establishment of the noise of the position determination and speed or an establishment of the noise of a position determined on the basis of satellite navigation are possible. Such determinations can, by way of example, be performed for satellite navigation, but also for other sensors. By way of example, an offset or a noise of an inertial sensor or an associated unit can be established.

Here, by way of example, unlike the normal "Zero-Velocity-Update", the standstill is not just used to establish errors and offsets, but through an express model switch this driving state is used with known parameters, by way of example, to establish noise values which would otherwise be difficult or impossible to observe. The underlying calculation model can similarly be switched to a more accurate but more processing-intensive model, which in normal operation would exceed the processing power of the system, but is now able to use the released processing power. In doing so a temporarily high accuracy/performance is achieved, which at this moment and for a particular time thereafter improves the system as a whole, without relying on additional hardware or more powerful CPU resources to do so. This allows a better performance to be achieved at the same cost.

Upon detection of a movement of the vehicle, speed determination or SPP is preferably selected as the localization algorithm for satellite navigation. Such localization algorithms for satellite navigation allow provision of the information typically needed during driving and are less processing-intensive than PPP. Consequently, more processing power is left for other functions needed during driving.

Upon detection of driving at a controlled constant speed, in particular with cruise control, SPP may be selected as the localization algorithm for satellite navigation. A spread of values of the satellite navigation is preferably also estimated and these are stored for later use in stochastic filtering in another driving state. By way of example, a noise matrix can be used with a Kalman filter.

During driving of the vehicle, satellite data may be monitored, but not evaluated, or at least not to any great extent, in particular not by means of PPP. During a standstill of the vehicle, information from the monitored satellite data may be used for position determination by means of PPP and, indeed, in particular for a fast initialization, and in particular without a prolonged and complicated initialization phase.

As a result of the described monitoring of satellite data during driving, the PPP localization algorithm can be executed substantially more quickly and more efficiently during the standstill. By way of example, as mentioned, an initialization phase can be skipped. In this way, the algorithm can achieve a particularly accurate position more quickly and consequently, by way of example, a standstill of just 15 seconds at traffic lights can be used to determine an accurate PPP position, without having to perform an initialization lasting minutes during the standstill.

If necessary, in particular if the positional accuracy is too poor, a position determination by means of PPP can also be switched to during driving. In doing so, in particular knowledge from the monitoring can be used. In this way, by way of example, the complicated, in particular time-intensive initialization phase can be dispensed with. This is typically associated with a standstill and therefore requires a very large amount of time and processing power during driving.

In one exemplary embodiment, carrier phases of satellites are monitored on the basis of movement information of the vehicle and a phase ambiguity is tracked and corrected. This allows particular functions to be performed.

In one exemplary embodiment, in response to a particular identified driving state, in particular a standstill or driving at a controlled constant speed, a determination of offsets and/or model parameters is carried out. In response to a particular identified driving state, a check and/or plausibility test of input signals or safety information can also be carried out. In this way, information can in particular be received which, in turn, is useful in other driving states for improving the localization.

A model switching and/or an event comparison between the different models or localization algorithms can also be carried out, in particular in order to identify errors and/or tampering and or to test for plausibility. Here, by way of example, a safety sensor, a security sensor or an environment sensor, by way of example, in the form of a radar, a camera or vehicle-to-X communication can be used as the localization module for plausibility checking applications or similar. It can be established whether all localization algorithms deliver the same results or deviate from one another. If they deviate, the reason for this can be established. Possible causes that are to be correspondingly checked are, by way of example, tampering, sensor fault, modelling errors due to use in the wrong driving situation or differing accuracy of the models.

By switching the model, the processing power can be optimized as a function of the driving situation. The optimum algorithms for the driving situation or the driving state can be selected in order to achieve optimum performance. In difficult situations, more complicated models can, by way of example, be used and in easier situations simpler models requiring less processing power can be used, as a result of which processing power and current consumption can be reduced. The establishment of relevant algorithm parameters such as, by way of example, tire radii, sensor offsets or sensor noise can be adapted to the respective driving situation. This allows a particularly good utilization of available processing power.

Various algorithm parameters such as, by way of example, phase ambiguities of satellites or sensor drift can preferably be continuously monitored, in particular in order to allow rapid switching between models or localization algorithms without long initialization phases.

A model switch or a switch between localization algorithms can also take place irrespective of the identified driving situations, by way of example, if indicated by other factors. By way of example, this can take place if the positional accuracy is too poor or a sensor offset has gone too long without adjustment.

In addition, the invention relates to an electronic control module which is configured to carry out a method according to the invention. The invention further relates to a non-volatile, machine-readable storage medium, containing program code, in the execution of which a processor carries out a method according to the invention. Regarding the method according to the invention, all embodiments and variants described can be used here.

BRIEF DESCRIPTION OF THE DRAWING

The person skilled in the art will infer other features and advantages from the following exemplary embodiments described with reference to the attached drawing. Here, FIG. 1 is a schematic view of a vehicle in which an exemplary embodiment of a method is carried out.

DETAILED DESCRIPTION

FIG. 1 shows a vehicle 10. The vehicle 10 has a total of four wheels 20, 22, 24, 26. A respective wheel speed sensor 30, 32, 34, 36 is associated with each wheel 20, 22, 24, 26. In this way, the respective wheel speeds of the wheels 20, 22, 24, 26 can be established.

In addition, the vehicle 10 has a satellite navigation module 40. The satellite navigation module 40 is configured to receive satellite signals, in order to determine the position and the speed of the vehicle 10.

The vehicle 10 also has an electronic control module 50, connected by a CAN bus (not shown) to the wheel speed sensors 30, 32, 34, 36 and to the satellite navigation module 40. In the control device 50 localization algorithms for determining the position of the vehicle are executed, wherein both localization algorithms based on the wheel speed sensors, which can also be referred to as vehicle dynamics sensors, and localization algorithms based on satellite navigation are used.

The following localization algorithms are available as localization algorithms for vehicle dynamics sensors:
single-track model,
adaptive single-track model,
double-track model,
adaptive double-track model.

The following tire models are available as tire models working in collaboration:
Burckhardt tire model,
Pacejka tire model.

The following localization algorithms are available as localization algorithms for satellite navigation:
Single Point Position determination (SPP),
Precision Point Position determination (PPP),
speed determination.

The control device 50 is configured, on the basis of the data from the wheel speed sensors 30, 32, 34, 36 and the satellite navigation module 40, to identify a driving state, wherein on the basis of the data provided the respective driving state is classified in one of the following driving states:
vehicle standstill,
normal driving in an area with no implications for the vehicle dynamics,
driving at a controlled constant speed,
driving at the limits of vehicle dynamics performance.

On the basis of the identified driving state the localization algorithms for satellite navigation and for vehicle dynamics sensors and a tire model are selected. This allows optimization of the position determination and an advantageous utilization of the available processing power.

In the following, a total of seven examples are provided, which can be advantageously implemented in the control device 50.

EXAMPLE 1

If a vehicle standstill is identified, it is not necessary to establish the position on the basis of the vehicle dynamics sensors (it is not actually moving). Instead, the available processing power is used in order to establish a position with PPP on the basis of satellite navigation. In this way, with a prolonged standstill, the starting position for the subsequent driving can be determined more accurately. Then, as soon as the vehicle moves again, the satellite navigation switches to speed determination and likewise estimates the movement on the basis of vehicle dynamics data, by way of example, on the basis of a vehicle dynamics model (double-track model, etc.) adapted by satellite navigation data.

Since the processing algorithm or localization algorithm, unlike a pure satellite navigation sensor, knows that the vehicle is at a standstill and, consequently, its position does not change, the calculation algorithm for PPP can be supported and thus optimized on the basis of this knowledge. In this way, the initialization time for the localization by means of PPP can be shortened from a few minutes to a few seconds.

EXAMPLE 2

As in Example 1, a Precision Point Positioning (PPP) is used at standstill. However, upon continuation of driving a Single Point Positioning (SPP) is established from GNSS and the movement established with the vehicle dynamics data. In this way, each time there is a standstill the processing-intensive PPP can be carried out in order to achieve the highest possible absolute accuracy. On the basis of the precise position, the highly-accurate position can then be supported with the "simpler" SPP algorithm and vehicle dynamics data.

In this way, the processing load for PPP can be used in each case at standstill in order to obtain highly-accurate positions, and during driving the processing load is used for calculating with vehicle dynamics data. As a result of this optimization, a higher accuracy can be achieved with a lower processing load than with the individual methods.

EXAMPLE 3

During driving at a controlled constant speed (e.g. cruise control) a Single Point Positioning (SPP) is carried out by means of satellite navigation (GNSS). Since it is known that the vehicle is travelling at a constant speed, the spread of values from GNSS, but also from the other sensors used, is estimated and then, by way of example, used during normal driving for corresponding stochastic filtering (e.g. noise matrix for Kalman filter).

EXAMPLE 4

When using the vehicle information, through knowledge of the movement made, even during driving a PPP can be carried out and the initialization of the PPP is not linked to the standstill.

Should the positional accuracy no longer meet the requirements, PPP can be switched to during driving as well (subject to good satellite reception) in order, on the basis of the continuously monitored data, to achieve a rapid PPP fix to increase accuracy. SPP can then be switched back to.

EXAMPLE 5

In addition, during driving, the phase and additional services can also be monitored by means of SPP, in order that during a standstill—thanks to provision of the tracked/ or calculated satellite data (e.g. high-resolution carrier phase information, resolved ambiguity of the carrier phase, highly-accurate ephemeris data and ionosphere data from data correction services [DGPS/SBAS/etc.])—a rapid PPP can be carried out (without having to calculate or receive all data from scratch).

If the movement information of the vehicle is used as the basis for tracking the carrier phases (resolving the carrier phase ambiguity is fundamental to PPP), even in the event of a phase cutoff through shading, reflection, multipath or other effects a very precise estimate is possible of how the phase ambiguity is continuing to develop. In this way, the susceptibility of the PPP to phase cutoffs can be reduced. This is the main disadvantage of switching to SPP (standard, without tracking) and back.

Through an optimized observation of relevant data, the complicated calculation during driving can be dispensed with without dispensing with information important for switching to PPP.

EXAMPLE 6

If the vehicle is directly in a favorable state for comparing vehicle dynamics values (determination of sensor offsets during a standstill/constant driving, determination of the tire radius with good satellite reception and driving straight ahead, etc.), the localization algorithm can switch to the appropriate calculation model.

EXAMPLE 7

The model switching can, in addition to the localization algorithm, also be extended to model switching for checking/plausibility testing of input signals and security. By way of example, as already mentioned above, a comparison between different algorithms or models can be carried out. If, for example, the position and movement are known very precisely, the input signals can be compared with these in order, for example, to identify tampering or errors, whereas such checking can be dispensed with in an "unknown" state to avoid errors and save processing time.

Such a model switching can also be performed cyclically, or associated with particular conditions (comparison of own position with sporadically available information from the environment such as environment sensors, other Car2X subscribers, etc.).

EXAMPLE 8

If the vehicle is directly in an area with no implications for the vehicle dynamics a less processing-intensive calculation algorithm—by way of example, the single-track model—can be used, since the accuracy in this area is sufficient. If, on the other hand, the vehicle moves, by way of example, into an area of tight bends, or if demanding situations arise in the situations at the limits of vehicle dynamics performance, then a more accurate but more processing-intensive model—by way of example, a double-track model—can be switched to.

Equally, the tire models (i.e., the Burckhardt tire model and the Pacejka tire mode) can be adapted to the respective driving situation and the parameters or models used in the process can be switched accordingly in each case.

It must be pointed out in general that vehicle-to-X communication in particular means a direct communication between vehicles and/or between vehicles and infrastructure facilities. By way of example, therefore, vehicle-to-vehicle communication or vehicle-to-infrastructure communication may be involved. Where in connection with this application communication between vehicles is referred to, this can essentially, by way of example, take place in the context of a vehicle-to-vehicle communication, which typically takes place without the intermediary of a mobile network or a similar external infrastructure and which therefore can be distinguished from other solutions which, by way of example, are based on a mobile network. By way of example, vehicle-to-X communication can take place using the standards IEEE 802.11p or IEEE 1609.4. Vehicle-to-X communication can also be referred to as C2Xcommunication. The sub-areas can be referred to as C2C (Car-to-Car) or C2I (Car-to-Infrastructure). The invention expressly does not, however, exclude vehicle-to-X communication with the intermediary of, by way of example, a mobile network.

The method described herein can be carried out in the sequence indicated. The method can, however, also be carried out in another sequence. The method may be carried out in one of its embodiments, by way of example, with a particular combination of steps, in such a way that no further steps are carried out. Essentially, however, other steps can also be carried out, including steps that have not been mentioned.

The claims in the application are not intended to be at the expense of achieving broader protection.

If in the course of the proceedings it transpires that a feature or a group of features is not absolutely necessary, then the applicant here and now seeks a wording of at least one independent claim, no longer comprising the feature or the group of features. This may, by way of example, involve a sub-combination of a claim existing as at the application date or a sub-combination of a claim existing as at the application date restricted by further features. Such newly worded claims or combinations of features are understood to also be covered by the disclosure of this application.

It is further pointed out that configurations, features and variants of the invention which are described in the various embodiments or exemplary embodiments and/or in the figures can be combined with one another as desired. Individual or multiple features are interchangeable as desired.

Resulting combinations of features are understood to also be covered by the disclosure of this application.

Back references in subordinate claims should not be construed as a waiver of the right to independent, objective protection for the features of the subordinate claims referred back to. These features can be used in any combination with other features.

Features which are only disclosed in the description or features which are disclosed in the description or a claim only in conjunction with other features can, in principle, be of independent inventive relevance. They can therefore also be included separately to distinguish from the prior art in claims.

The invention claimed is:

1. A method for selecting localization algorithms in a vehicle, comprising:
   identifying a driving state of the vehicle, and
   selecting at least one localization algorithm from a predefined set of localization algorithms on the basis of the driving state, wherein:
      when the driving state of the vehicle is vehicle driving:
         monitoring satellite data, and
         not evaluating the monitored satellite data by Precision-Point Positioning (PPP) determination algorithm, and
      when the driving state of the vehicle is vehicle standstill, evaluating the monitored satellite data utilizing PPP determination algorithm.

2. The method according to claim 1, wherein identifying the driving state of the vehicle comprises utilizing satellite navigation and/or at least one vehicle dynamics sensor.

3. The method according to claim 1, wherein identifying the driving state of the vehicle comprises utilizing electronic stability control.

4. The method according to claim 1, wherein the driving state is one of vehicle standstill, normal driving in an area with no implications for the vehicle dynamics, driving at a controlled constant speed, or driving at the limits of vehicle dynamics performance with regard to lateral acceleration.

5. The method according to claim 4, wherein selecting at least one localization algorithm for the satellite navigation system comprises selecting one of Single Point Position determination (SPP), Precision Point Position determination (PPP), or speed determination.

6. The method according to claim 1, wherein at least one localization algorithm for vehicle dynamics sensors is selected.

7. The method according to claim 6, wherein the localization algorithm for vehicle dynamics sensors is one of a single-track model, an adaptive single-track model, a double-track model, or an adaptive double-track model.

8. The method according to claim 7, wherein the localization algorithm may be combined with a tire model.

9. The method according to claim 1, further comprising deactivating a position establishment on the basis of vehicle dynamics sensors in response to detection of a standstill of the vehicle.

10. The method according to claim 1, further comprising notification of the standstill to the localization algorithm in response to detection of a standstill of the vehicle for possible model switching in a satellite navigation module or a vehicle dynamics module.

11. The method according to claim 1, further comprising selecting speed determination or SPP as the localization algorithm for satellite navigation in response to detection of a movement of the vehicle.

12. The method according to claim 1, wherein selecting at least one localization algorithm for the satellite navigation system comprises selecting SPP in response to detection of driving at a controlled constant speed and further comprising estimating a spread of values of the satellite navigation system and storing the values for later use in stochastic filtering in another driving state.

13. The method according to claim 1, further comprising monitoring carrier phases of satellites on the basis of movement information of the vehicle for tracking and correcting phase ambiguity.

14. The method according to claim 1, further comprising determining offsets and/or model parameters and/or noise values in response to a standstill of the vehicle or driving at a controlled constant speed.

15. The method according to claim 14, further comprising performing a plausibility test of input signals is in response to a particular identified driving state.

* * * * *